(12) United States Patent
Shope

(10) Patent No.: US 10,492,485 B1
(45) Date of Patent: Dec. 3, 2019

(54) BRACKET MOUNTING SYSTEM FOR ANIMAL TRAPS

(71) Applicant: Casey W. Shope, Gladstone, MI (US)

(72) Inventor: Casey W. Shope, Gladstone, MI (US)

( * ) Notice: Subject to any disclaimer, the term of this patent is extended or adjusted under 35 U.S.C. 154(b) by 0 days.

(21) Appl. No.: 16/043,387

(22) Filed: Jul. 24, 2018

(51) Int. Cl.
*A01M 23/24* (2006.01)
*F16M 11/04* (2006.01)

(52) U.S. Cl.
CPC ........ *A01M 23/245* (2013.01); *F16M 11/046* (2013.01)

(58) Field of Classification Search
CPC .... A01M 23/245; A01M 23/24; A01M 23/26; A01M 23/265; A01M 23/28; A01M 23/30; A01M 23/32; A01M 23/34; A01M 23/00; F16M 11/046; G09F 2007/1804; G09F 2007/1817
USPC ......... 248/125.1, 218.4, 219.1, 219.2, 219.3, 248/227.3; 43/88–89, 96
See application file for complete search history.

(56) References Cited

U.S. PATENT DOCUMENTS

| | | | | |
|---|---|---|---|---|
| 1,858,713 A | * | 5/1932 | Martin | A01M 23/24 43/96 |
| 2,208,358 A | * | 7/1940 | Chandler | E04H 12/32 248/540 |
| 2,720,050 A | | 10/1955 | Pfeiffer | |
| 4,517,762 A | | 5/1985 | Venetz | |
| D286,741 S | | 11/1986 | Clauss | |
| 4,766,694 A | * | 8/1988 | Buckley | A01M 23/245 177/25.19 |
| 7,421,822 B1 | | 9/2008 | Ley | |
| 8,950,723 B1 | * | 2/2015 | Fogelstrom | A45B 11/00 135/16 |
| 9,565,850 B2 | | 2/2017 | Hagerty | |
| 2005/0210734 A1 | * | 9/2005 | Nowack | A01M 23/245 43/96 |
| 2007/0045491 A1 | * | 3/2007 | Spencer | E04G 13/00 248/218.4 |

OTHER PUBLICATIONS

PCS Outdoors, 12 pack Asure Set Bodygrip Clamp with Duke 110, online catalog, 2017, 4 pages, www.pcsoutdoors.com, U.S.

* cited by examiner

*Primary Examiner* — Christopher Garft
(74) *Attorney, Agent, or Firm* — Northern Michigan Patent Law, PLC

(57) ABSTRACT

A trap-holding bracket for holding both conibear style body-gripping traps and leghold type traps. The bracket comprises a hollow, generally box-shaped body with top, bottom, front, and rear walls, an enclosed horizontal slot in the front wall, horizontal tab arms extending outwardly from the sides of the top and bottom walls to define extended jaw slots configured to receive and hold the inner wire ends of a body-gripping trap in their set position, and a vertical L-shaped tab arm extending above the front end wall and defining an open-ended lateral slot for receiving an outer base end of a leghold trap in a lateral sliding motion.

12 Claims, 12 Drawing Sheets

BRACKET MOUNTING SYSTEM FOR ANIMAL TRAPS

RELATED APPLICATIONS/PRIORITY BENEFIT CLAIM

The present inventor (Shope) is named in U.S. provisional patent application No. 62/579,317 filed Oct. 31, 2017.

FIELD

The subject matter of the present application is in the field of devices for supporting animal traps off the ground on an elevated support.

BACKGROUND

Devices for holding or supporting animal traps on stakes, sticks, and the like are generally known. These prior trap holders are generally designed to hold one of two basic types of trap: "conibear" or body-gripping type traps with inner wire jaw ends, and foot- or leg-holding (leghold) traps with a short tang on the end of an inner frame member.

U.S. Pat. No. 9,565,850 to Hagerty discloses a stake-mounted bracket with a planar midsection having a plurality of circular mounting apertures, and a planar angled end section with a plurality of elongated slots for receiving a tang on the inner end of a trap.

U.S. Pat. No. 2,720,050 to Pfeiffer discloses an underwater animal trap support with a hinged platform adjustably mounted on a stake or stake to hold the trap underwater, and to rotate like a weather vane in the underwater current.

U.S. Pat. No. 4,766,694 to Buckley discloses a trap holder in the form of a box with an open end for receiving the wire jaws of a trap, with notches in the side walls adapted to receive the spring arm of the trap to support the trap jaws in an upright position in the box.

Prior trap holders are often limited in terms of mounting options, the types of trap that they can hold, and/or the security and reliability of the connection between the holder and the trap.

BRIEF SUMMARY

I have invented a trap-supporting bracket and trap mounting system primarily adapted to be mounted on a stake, stick, pole or similar vertical support (hereafter "stake"), but also useful for mounting on non-stake supports such as logs, trees, and rocks. The trap-supporting bracket is configured to hold "conibear" (body-gripping) type traps by their inner wire jaw ends, and to hold leg-hold type traps by outer portions of the trap base located near the outer radius/diameter of the set jaws, such as the outer ends of the longitudinal bottom brace, or the closed-loop "dog" end of the bridge of the trap opposite the tang. The inventive bracket has a novel structure designed to maximize a secure, non-slipping connection to the stake, in different orientations, while properly positioning and holding both types of trap at the desired height. The bracket also lends itself to being formed from a flat blank, reducing the cost and complexity of manufacture.

The bracket comprises a hollow, generally box-shaped bracket body comprising a top wall, a bottom wall, a front end wall, and a rear end wall, the hollow bracket body preferably having open sides. Aligned stake support apertures formed through the top and bottom walls allow a stake to be inserted vertically through the hollow interior, and an opening in the rear end wall allows a bolt, screw, or similar stake-engaging member to be inserted through the rear end wall to lock the bracket in place on the stake. A larger stake can be inserted through the hollow interior via the open sides, either horizontally or, if the bracket is rotated, vertically.

Horizontal tab arms extend laterally in a horizontal plane from the side edges of the top and bottom walls to define spaced top and bottom jaw slots on both sides of the hollow bracket body, the jaw slots sized to receive and hold the spaced-apart inner jaw ends of a body-gripping trap when the trap is cocked or set. Vertical tab arms extend laterally in a vertical plane from the upper and lower edges of the front end wall or face of the bracket, to define open-ended slots above and below the face of the bracket configured to receive an outer end of the trap's base in a sideways sliding direction. In a preferred form, the open-ended lateral slots open in opposite directions above and below the face of the bracket.

The vertical stake support apertures in the bracket body preferably have front wedge ends to center the bracket against a stake as a bolt or screw operable from the rear end wall is tightened against the stake.

In a further aspect, the invention comprises a system combination of the bracket and one or more trap mounting extensions adapted to be mounted to an enclosed slot in the face of the bracket.

In a first form, the trap-mounting extension comprises a flat arm with one end configured to be inserted axially in the enclosed slot in the face of the bracket. A longer free angled offset portion of the flat arm is configured to support a leghold trap by the longitudinal bottom brace portion of the frame. The flat arm also allows the trap to be rotated to support the trap by the shorter perpendicular bridge portion of the frame, in a direction aligned with or parallel to the longitudinal bottom brace.

In a second form, the trap-mounting extension comprises a generally L-shaped or "hooked" stake arm extending from its rear edge. The hooked stake arm is configured to be inserted in the closed slot in the face of the bracket, and to engage a front or a rear face of a stake inserted through the bracket to be clamped against the stake in the interior of the bracket, reinforcing the connection of the trap-mounting extension to the bracket. In a further form, the trap-mounting extension comprises a wide flat platform on which a trap simply rests when set.

In a further aspect of the invention, an adjustable clip is provided for mounting the bracket in different orientations on the end of a culvert or drain pipe.

Terms of orientation such as "vertical", "horizontal", "top", and "bottom" should be understood in a general and relative sense, and may depend on the installed orientation of the bracket and the orientation of any stake or other support to which the bracket is mounted.

These and other features and advantages of the invention will become apparent from the detailed description below, in light of the accompanying drawings.

DETAILED DESCRIPTION

Figure 1:
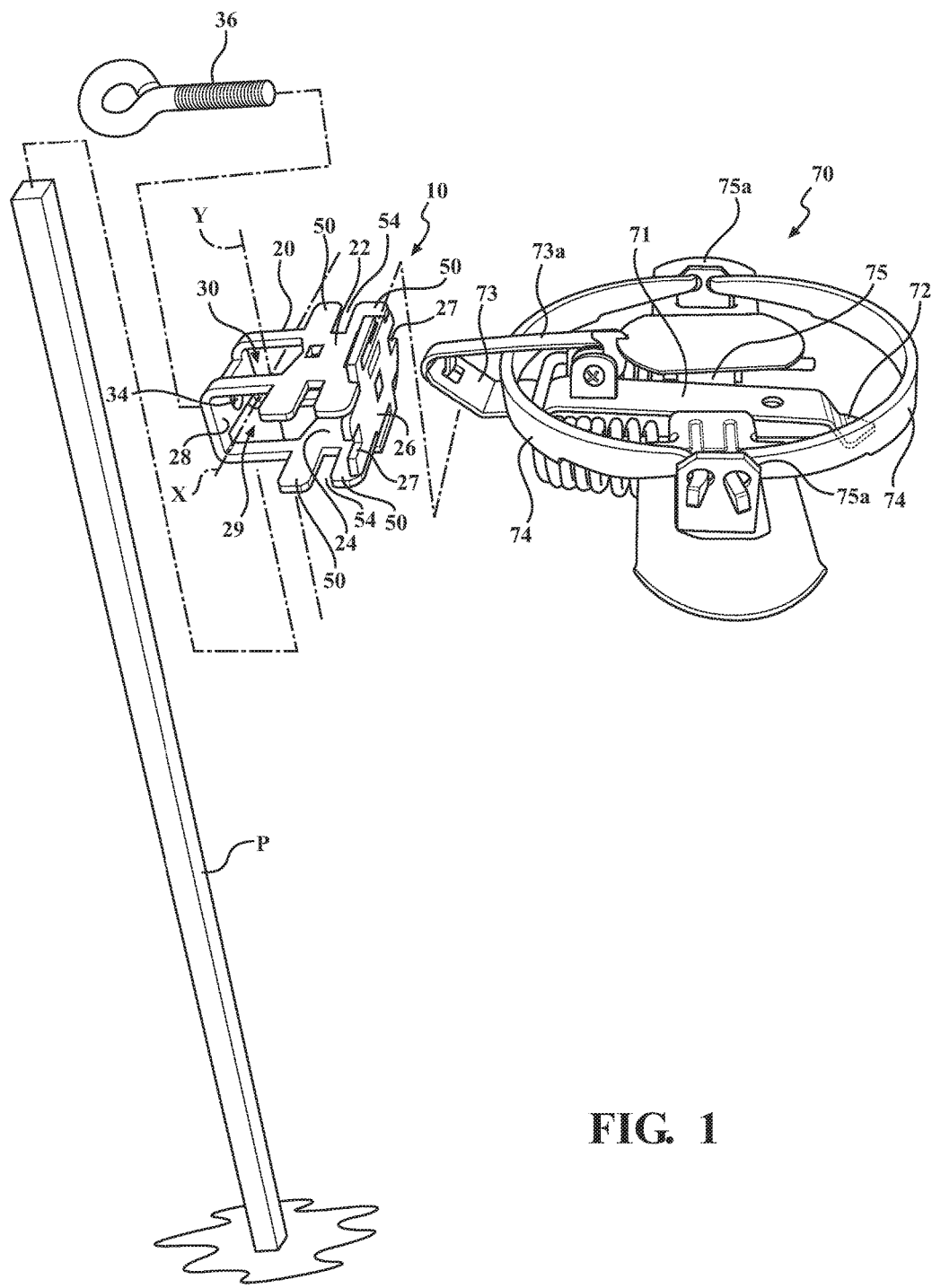
FIG. 1 is a perspective view of an exemplary trap-holding bracket according to the invention, exploded relative to a stake extending through the bracket, the bracket supporting a leg-hold type of trap.
Figure 2:
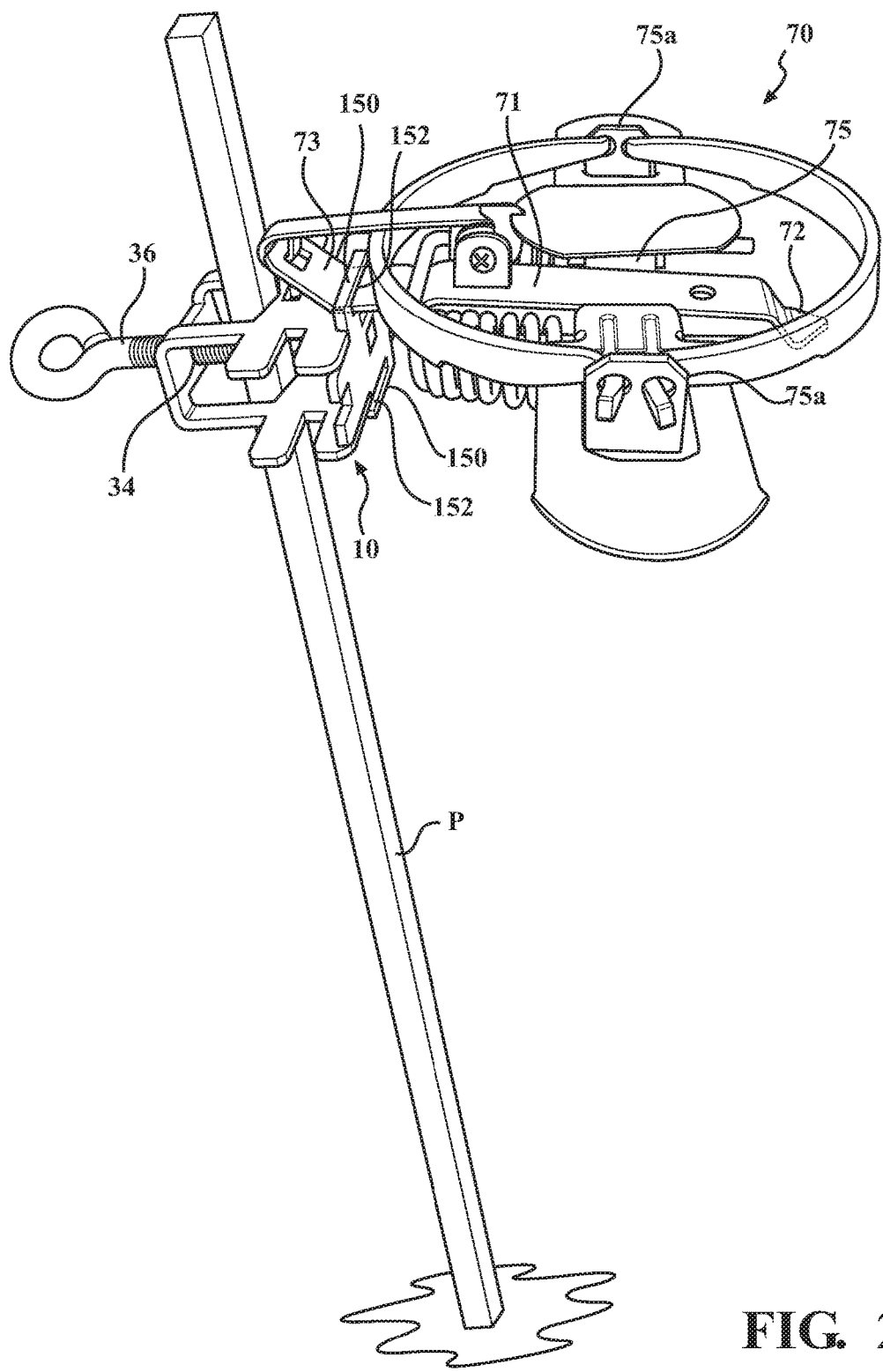
FIG. 2 is similar to FIG. 1, showing the trap-holding bracket, stake, and trap assembled.

Referring first to FIGS. 1 and 2, a trap-holding bracket 10 is shown in exemplary form in order to teach how to make and use the claimed invention. Bracket 10 comprises a hollow body 20 having a top wall 22, a bottom wall 24, a front end wall or face 26, and a rear end wall 28. In the illustrated example the bracket is formed from sheet metal, for example a heavy gauge stainless steel, although other metals or non-metal materials such as durable polymers could be used. The illustrated example further has open sides 29 as a preferred option, so that a horizontal stake or equivalent may inserted through the bracket body along axis X to support the bracket horizontally from a riverbank, for example. Alternately, since the open sides 29 are larger than the vertical support apertures 30, bracket 10 can be rotated and mounted vertically on a larger stake inserted vertically along axis Y through the re-oriented side openings 29.

Figure 4:
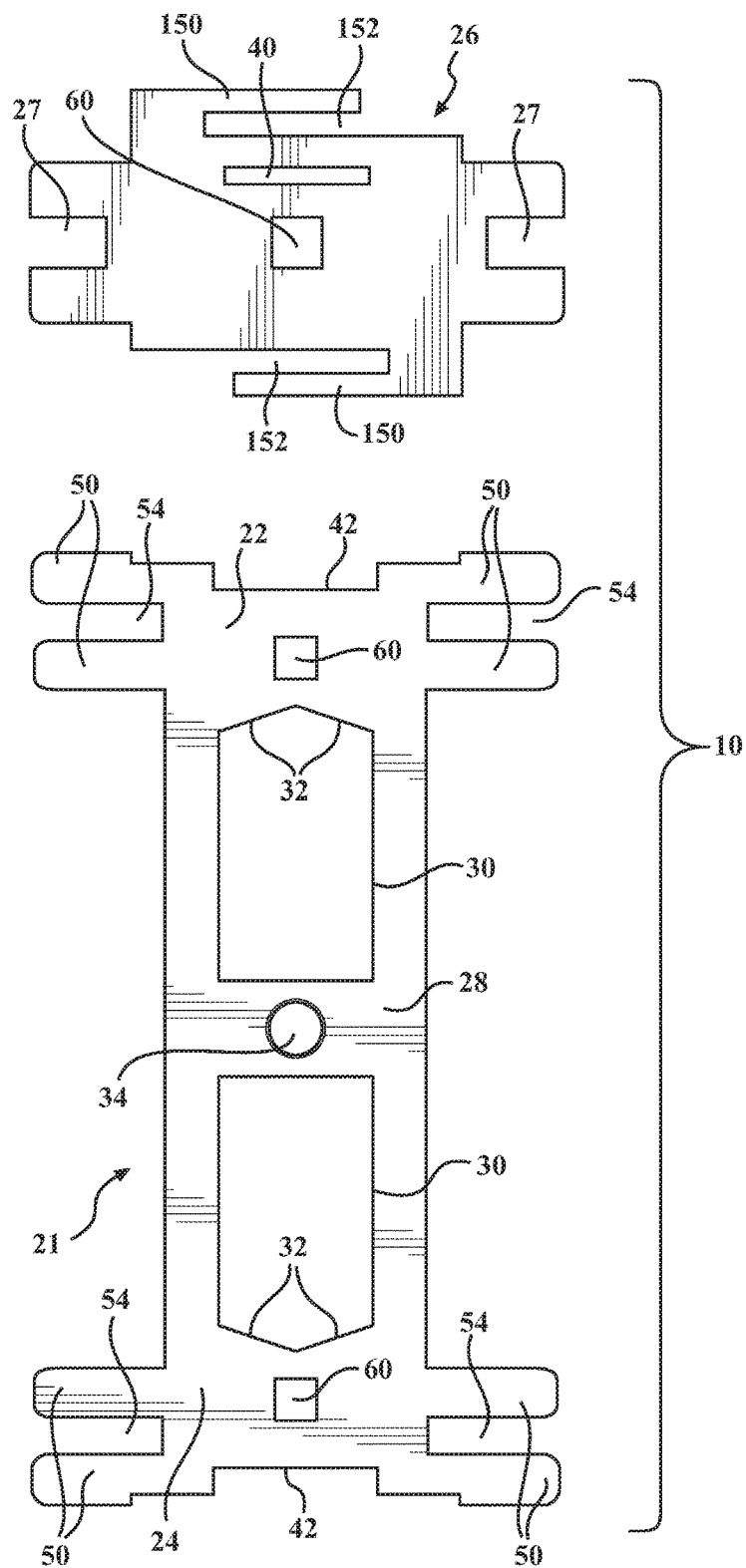
FIG. 4 is a plan view of a metal blank, in two pieces, from which the trap-holding bracket of FIG. 1 is formed.

Further in the illustrated example, best shown in FIG. 4, bracket 10 is formed in two pieces 21 and 26 (blank 26 in the illustrated example comprises the front end wall). The top, bottom, and rear end walls 20, 22, and 28 are formed from flat blank 21 and bent or formed into the generally box-shaped or cuboid structure shown in FIG. 1. Front end wall 26 is formed separately (also flat) and then attached to piece 21 in any known metal-joining manner (for example, welding, joint-forming adhesives, interference fit between parts, swaging, etc.) to close the front end of the hollow body 20.

Top and bottom walls 22, 24 include vertically aligned stake support apertures 30 so that a stake-like support P can be inserted vertically through hollow body 20 along axis Y. A bolt aperture 34 formed in the rear end wall 28 allows a bolt or similar stake-engaging member 36 (FIGS. 2 and 3) to be inserted from the rear to clamp bracket 10 to the stake. Bolt aperture 34 may be threaded internally in order to draw and tension the bracket rearwardly against the stake as the bolt 36 is threaded forwardly through aperture 34.

In the illustrated example, stake support apertures 30 are generally square in shape, although their shape may vary, and the apertures may be formed with a wedge-shaped forward end defined by angled forward edges 32. The wedge shape helps to center and lock the bracket against a round stake if a rectangular stake corresponding to the size of the apertures is not available, or against any other irregularly-shaped stake, as the clamping member 36 is urged forwardly.

Front end wall 26 may include an enclosed horizontal slot 40 for use in supporting a trap-mounting extension arm (described below). Top wall 22 and possibly other of the hollow body walls may also include an enclosed slot 42 for use with an extension arm in a manner described below when the bracket is in a different orientation or mounted on a different type of support.

Still referring to FIGS. 1 and 2, horizontal tab arms 50 extend outwardly from the sides of top and bottom walls 22, 24 in horizontal planes generally aligned with the top and bottom walls 22, 24, respectively, and generally in a direction parallel to front end wall 26 and spaced from each other along the top and bottom walls to form open-ended jaw slots 54. Jaw slots 54 are vertically aligned between the top and bottom walls on their respective sides of the bracket body, and are sized to receive the wire or rod-shaped inner ends of the jaws of a conibear type trap when the inner ends are squeezed together to a cocked or set position. While in the illustrated example a single vertically-spaced pair of jaw slots 54 is formed on each side of the bracket body 20, it is possible to add additional tabs 50 to the sides of the top and bottom walls in order to form additional sets of jaw slots along the sides of the bracket body. The dimensions of tab arms 50 and jaw slots 54 may vary depending on the size or model of the trap being supported therein.

If front end wall 26 is wider than hollow body 20, as in the illustrated example, the outer protruding ends of front end wall 26 may form or include some of the horizontal tab arms 50 to help define jaw slots 54.

Bracket 10 is also provided with a small rectangular aperture 60 on the front end wall 26, and optionally on other of the body walls, suitable for inserting supplemental fasteners such as screws, nails, or wire in order to attach bracket 10 to non-stake supports such as trees, logs, and rocks. It is also possible to provide one or more open notches 27 along the side edges of the front wall for use as fastening points, particularly if using wire.

FIG. 2 shows the trap-holding bracket 10 of FIG. 1, mounted on a stake P extending through the bracket, the bracket 10 supporting an example leg-hold type trap 70 of known type. Stake P is inserted into firm ground or the bottom of a shallow body of water, the stake support apertures 30 are aligned over the stake, and bracket 10 is slid down the stake to the desired height. Bolt 36 is then threaded through bolt aperture 34 into clamping engagement with stake P to lock bracket 10 at the desired height. Trap 70 includes two flat bar-like cross pieces 71, 75 forming its frame. The shorter cross member or bridge 71 terminates in a short, free tang end 72 on one side of the trap and in a longer dog end 73 on the other side of the trap, the dog end forming a closed-loop structure when a dog 73*a* forming part of the trap's triggering mechanism is set in known manner. The short inner tang end 72 lies within the radius of the jaws of the trap when the jaws 74 are spread apart and set. The outer ends of the trap base such as the longer dog end 73 and the outer ends 75*a* of bottom brace 75 lie at or outside the radius or outer edges of the set jaws, and are effectively obstructed by the overlying dog 73*a* and the overlying set jaws (and springs, depending on the type of leghold trap) at the outer ends 73 and 75*a* of the base.

Bracket 10 is configured to receive and hold leghold trap 70 by the dog end 73 of bridge 71, in its closed-loop condition with the dog 73a set, or alternately by one of the outer ends 75a of bottom brace 75 near their junction with the pivoting ends of the jaws. The upper and lower edges of front face 26 are provided with right-angled or L-shaped vertical tab arms 150 in a vertical plane generally coplanar with the plane of front face 26. Vertical tab arms 150 form open-ended lateral slots 152 spaced above and below the body 20 of the bracket, preferably wider than the enclosed horizontal slot 40 on the front end wall, and positioned to receive the dog end 73 of the trap or one of the outer ends 75a of bottom brace 75 in a sliding lateral motion from the side of the bracket. If the dog end 73 is used, as illustrated, dog 73a is positioned above the vertical tab arm 150 for free movement. Outer ends 75a of the bottom brace 75 may likewise be inserted beneath the vertical tab arm 150 in slot 152 to support the trap, with the jaws and any associated spring mechanisms positioned above the vertical tab arm 150, simply by rotating the trap ninety degrees and sliding one of the outer ends 75a underneath the tab arm 150 into slot 152 in the same manner as the dog end 73 as shown in FIGS. 1 and 2.

Bracket 10 holds the set trap in a desired trapping position at a predetermined height and rotational angle on stake P, for example next to the entrance or exit of an animal's home, or along a route the animal is expected to travel. The mounting of trap 70 by dog end 73 of the bridge (or by bottom brace outer ends 75a) tends to hold the trap securely to the bracket. However, such traps are typically provided with a retaining chain, wire, or cable (not shown) that can be connected to a portion of the bracket or to the stake P in known manner, so that the released trap cannot be dragged away by an animal, or by the current in a body of water.

Figure 3:
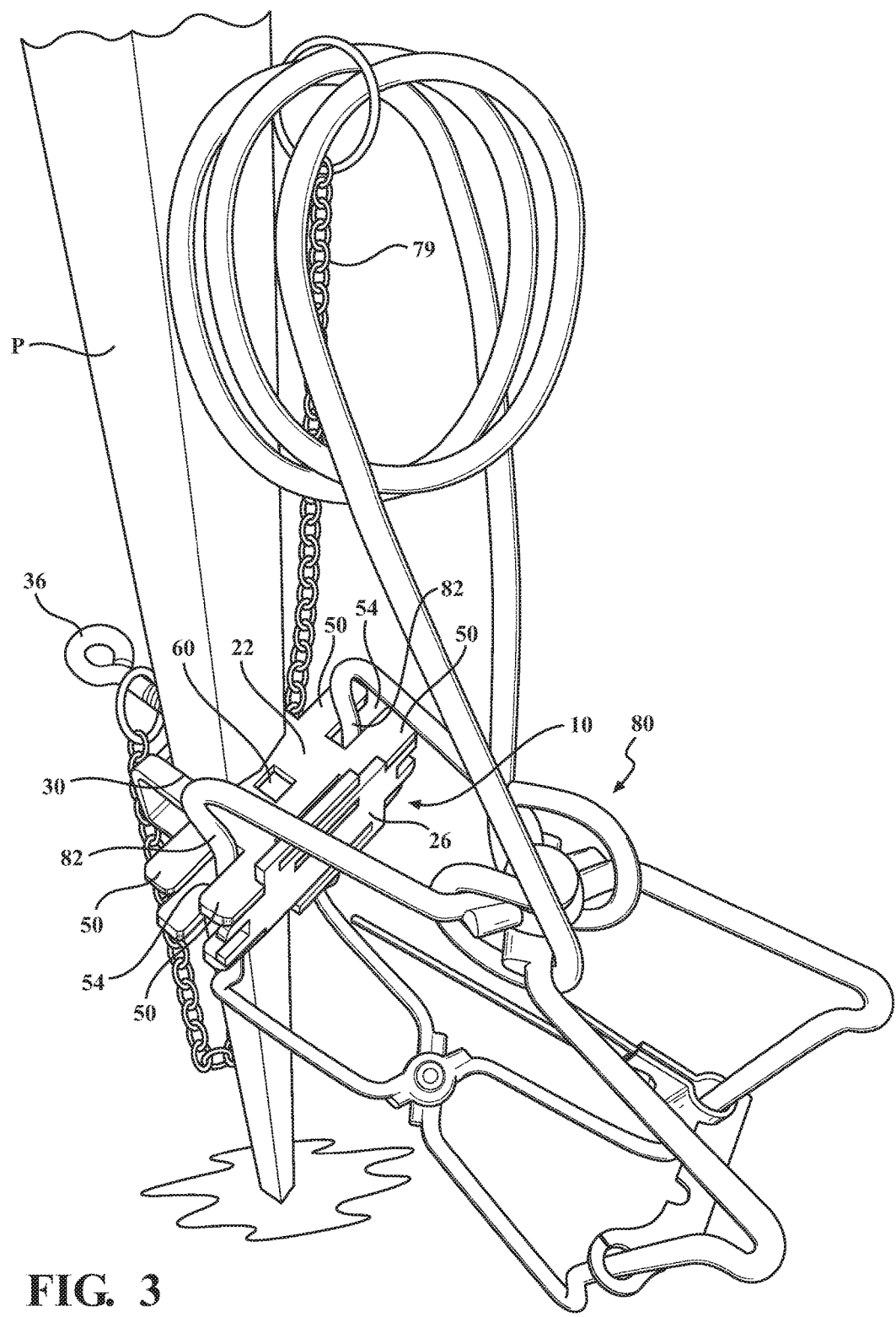
FIG. 3 is similar to FIG. 2, but shows a conibear-type trap secured to the bracket.

FIG. 3 is a perspective view of the trap-holding bracket 10 of FIG. 1, mounted on a stake P extending through the bracket as in FIG. 2, the bracket supporting a body-holding type trap 80. Traps such as 80 include inner ends 82 made of stiff rod or wire (hereafter "wire"), capable of being forced inwardly and locked in place by a trigger mechanism in known manner to set the trap. With bracket 10 secured in place on stake P, the inner ends 82 of trap 80 can be squeezed together into jaw slots 54 to the set position. The spacing of the inner ends 82 in the trap's set position is less than the distance between the outer ends of the tab arms 50, so that the trap cannot be removed either horizontally or vertically from bracket 10 until the trap is sprung, releasing inner ends 82 to open outwardly and exit the trap's jaw slots 54. At that point the trap 80 may fall free of bracket 10, but is retained by the chain 79 to the bracket, or to the stake, or to a nearby anchor such as a rock, log, tree, etc.

While bracket 10 is illustrated herein as being preferably mounted on either a vertical or horizontal stake, bracket 10 may be reoriented with front end wall 26 facing upwardly, and one of the top or bottom walls 22, 24 held against the side of a tree or stump by either a wire or similar wrap device wrapped around the tree and through one or more of the apertures in bracket 10, or by a fastener such as a screw or nail inserted through an aligned set of supplemental fastener apertures 60 formed in the top and bottom walls 22, 24 of the hollow body 20. Bracket 10 may also be mounted on a horizontal log in different orientations, also with a screw or nail fastener inserted through aligned supplemental fastener apertures in the top and bottom walls 22, 24 of the bracket's hollow body 20. The flat faces of the top and bottom walls, and the aligned tab arms 50 extending from the sides of the top and bottom and front end walls, provide a wide, flat, stable support for the bracket against various mounting surfaces in different orientations.

Figure 5:
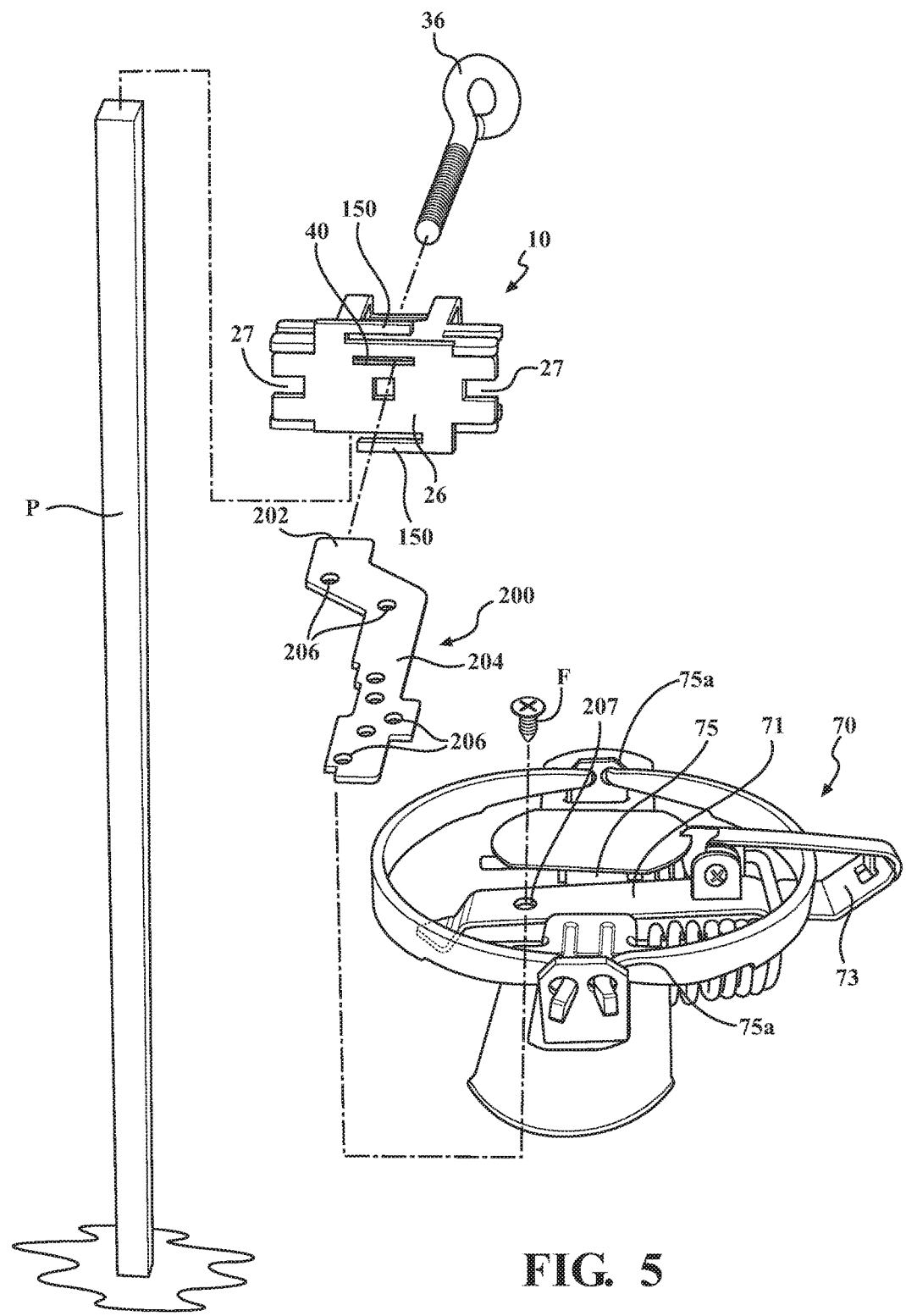
FIG. 5 is similar to FIG. 1, but shows an extension arm for mounting the leg-hold trap to the bracket in a rotated or perpendicular position across the trap's bridge.
Figure 6:
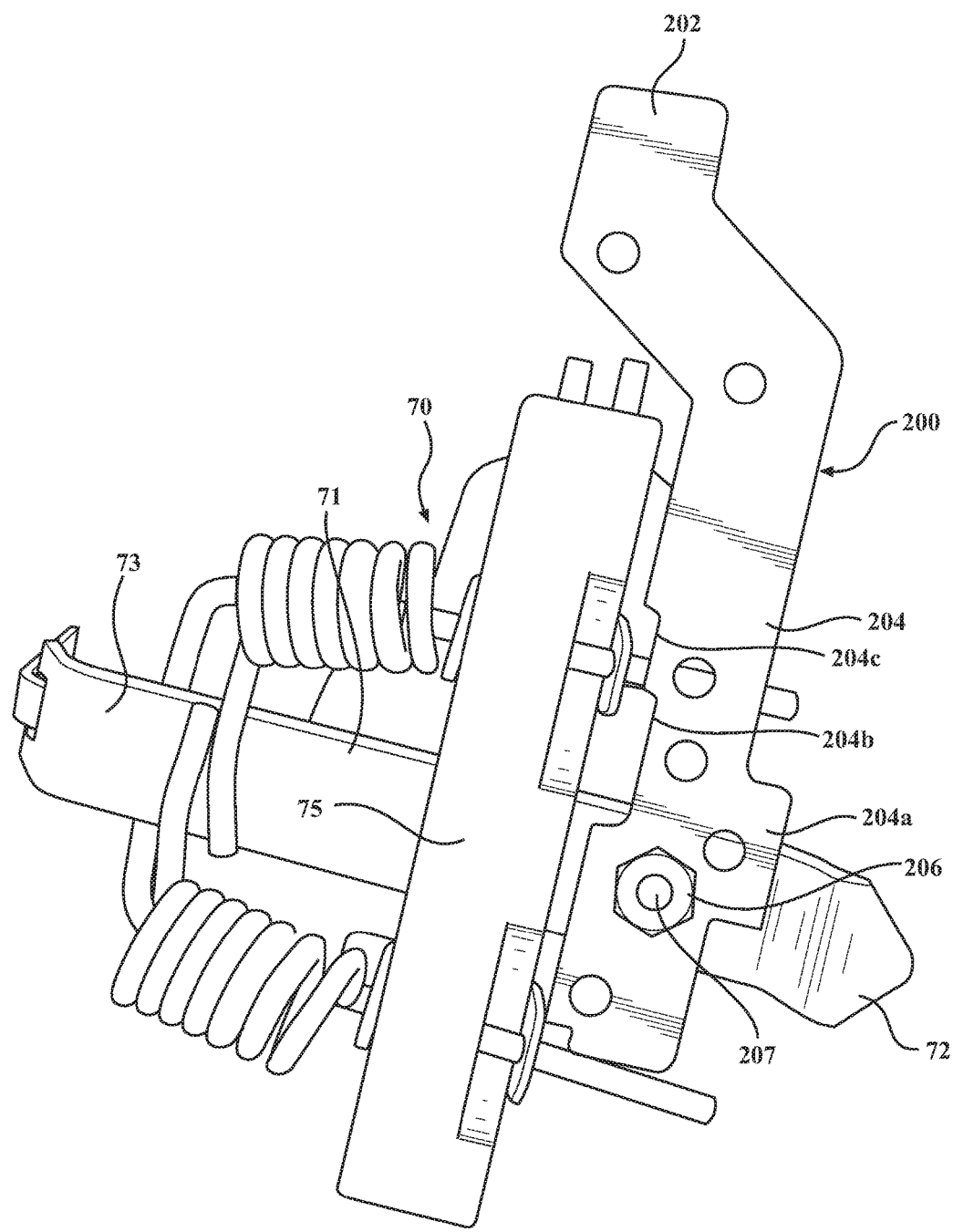
FIG. 6 is a plan view of the extension arm of FIG. 5.
Figure 7:
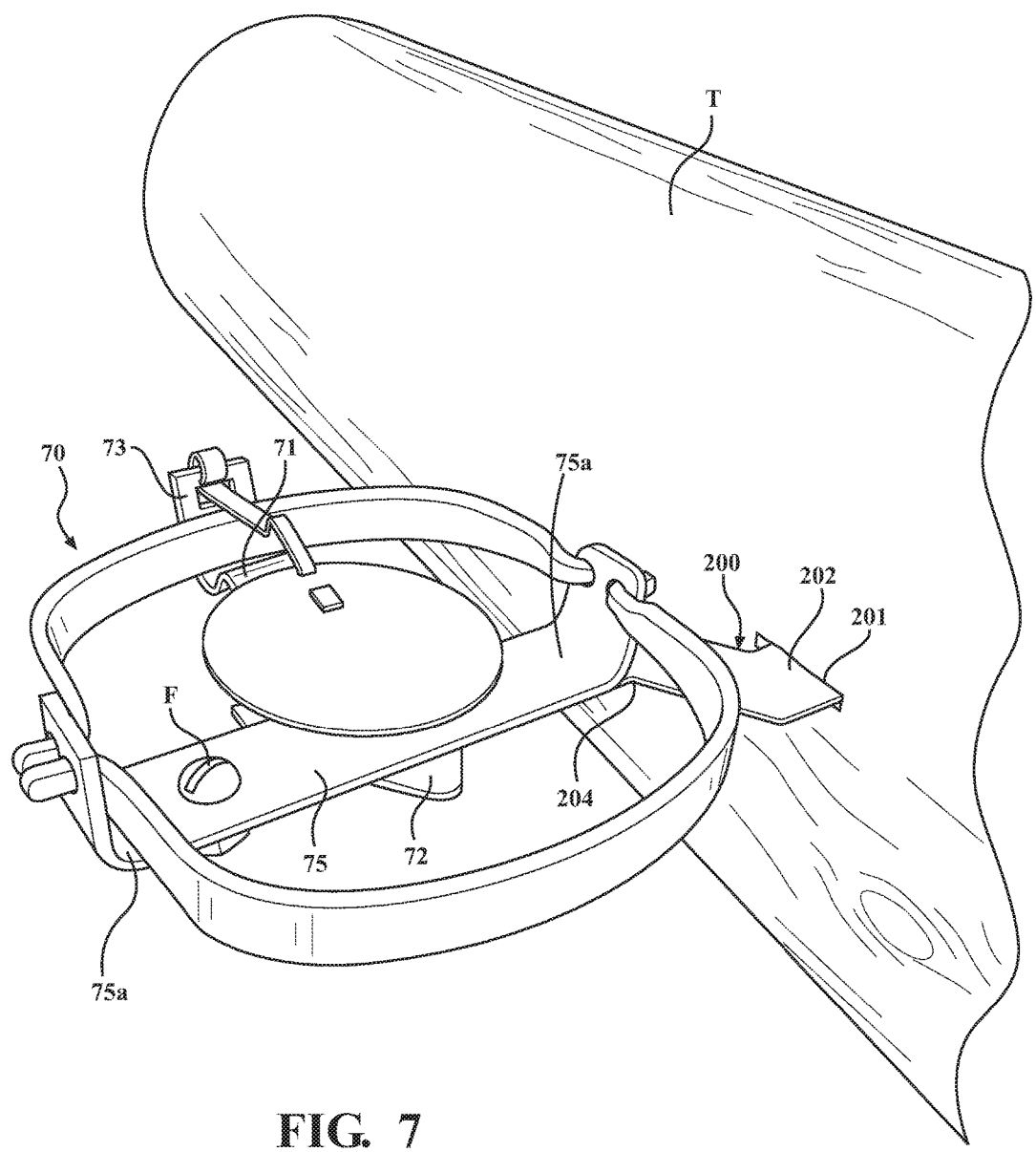
FIG. 7 shows the rotator extension arm of FIG. 5 mounted in a stump or log, with trap mounted to the arm along the longitudinal bottom brace of the trap frame.

FIGS. 5 through 7 show a trap-mounting extension comprising a flat arm 200 with one end 202 configured to be inserted axially in the enclosed slot 40 in the face 26 of the bracket 10. A longer free angled or offset portion 204 of the flat arm 200 is configured to mate with the longer, longitudinal main bottom brace 75 (sometimes known as a "stock bar") or with the shorter perpendicular bridge portion 71 of the trap 70, in a direction generally aligned with or parallel to the longitudinal bottom brace 75. Apertures 206 formed at various locations on the extension arm 200 allow the trap to be secured with one or more bolts or screw fasteners F through one or more similar apertures 207 formed in the trap.

FIGS. 5 and 6 show trap 70 mounted on the extension arm 200 by the bridge portion 71 of the trap frame, via an aperture 207 aligned with one of the apertures on the extension arm and a fastener F inserted through the aligned apertures. Bridge portion 71 is laid across the extension arm 200, in the illustrated example in a generally perpendicular orientation with the main bottom brace 75 parallel to but offset from the extension arm, which allows the jaws of trap 70 to be set at a desirable angle relative to bracket 10.

FIG. 7 shows trap 70 mounted on the extension arm 200 by the longitudinal main bottom brace 75. In this configuration, the main bottom brace 75 is aligned with the offset portion 204 of the extension arm 200, and fastened thereto with a fastener F through aligned holes in the trap and the extension arm.

The multiple mounting apertures on extension arm 200, the main offset arm portion 204, and the various tab and indented portions 204a, 204b, 204c on the offset extension portion 204 allow a significant degree of flexibility in mounting a leghold type trap 70 across the bridge 71 and/or along the main bottom brace 75.

FIG. 7 also shows extension arm 200 mounted directly into a log or tree T, by inserting the inner end 202 into a slot 201 formed in the tree with an axe or knife in case a bracket 10 is not available.

Figure 8:
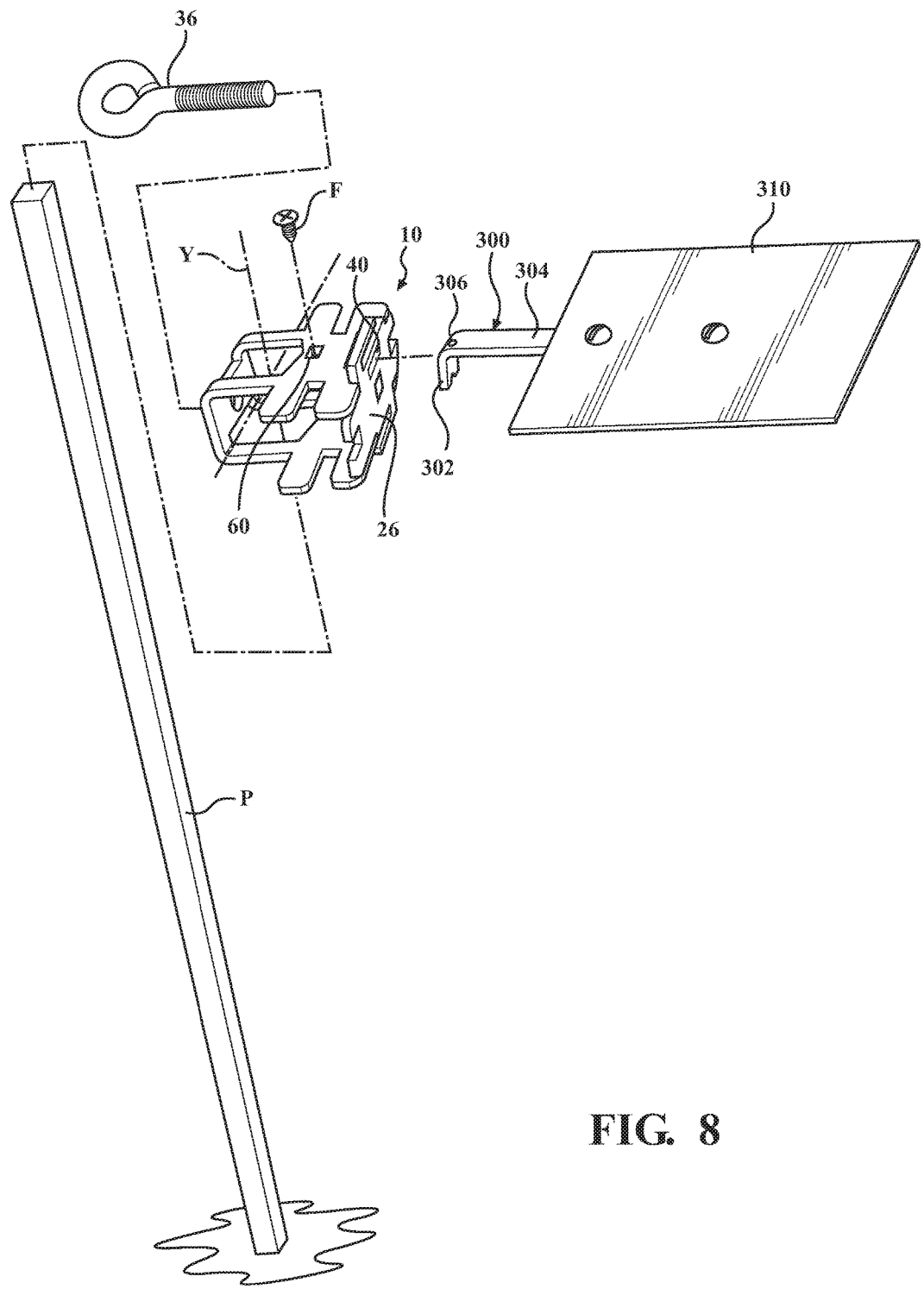
FIG. 8 is similar to FIG. 1, but shows an extension for mounting the leghold trap to the bracket with a hooked internal clamping connection to the stake, in a vertical stake orientation.
Figure 8A:
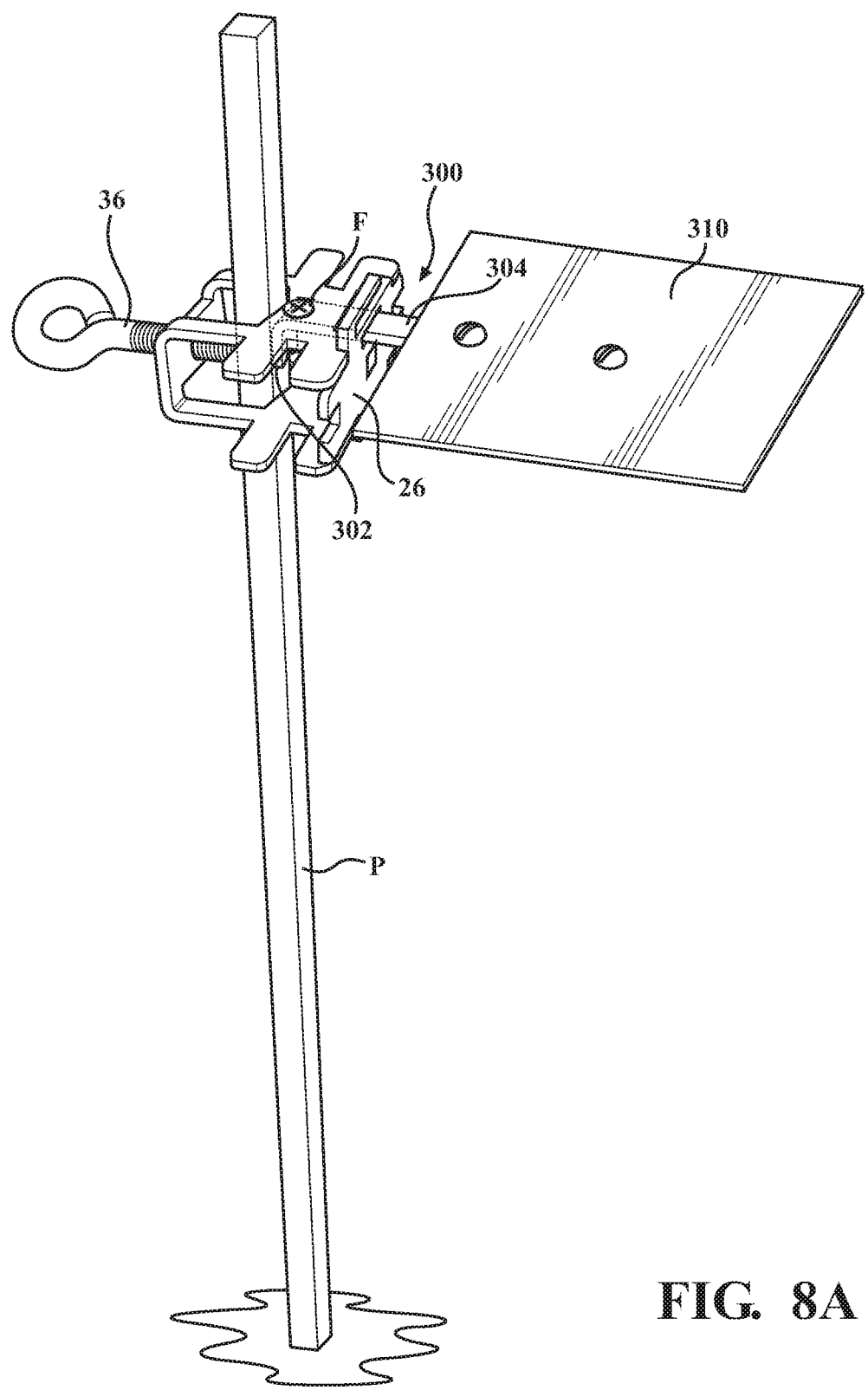
FIG. 8A is a perspective view of the assembled stake, bracket, and extension platform of FIG. 8, with a vertical stake orientation through the bracket body
Figure 9:
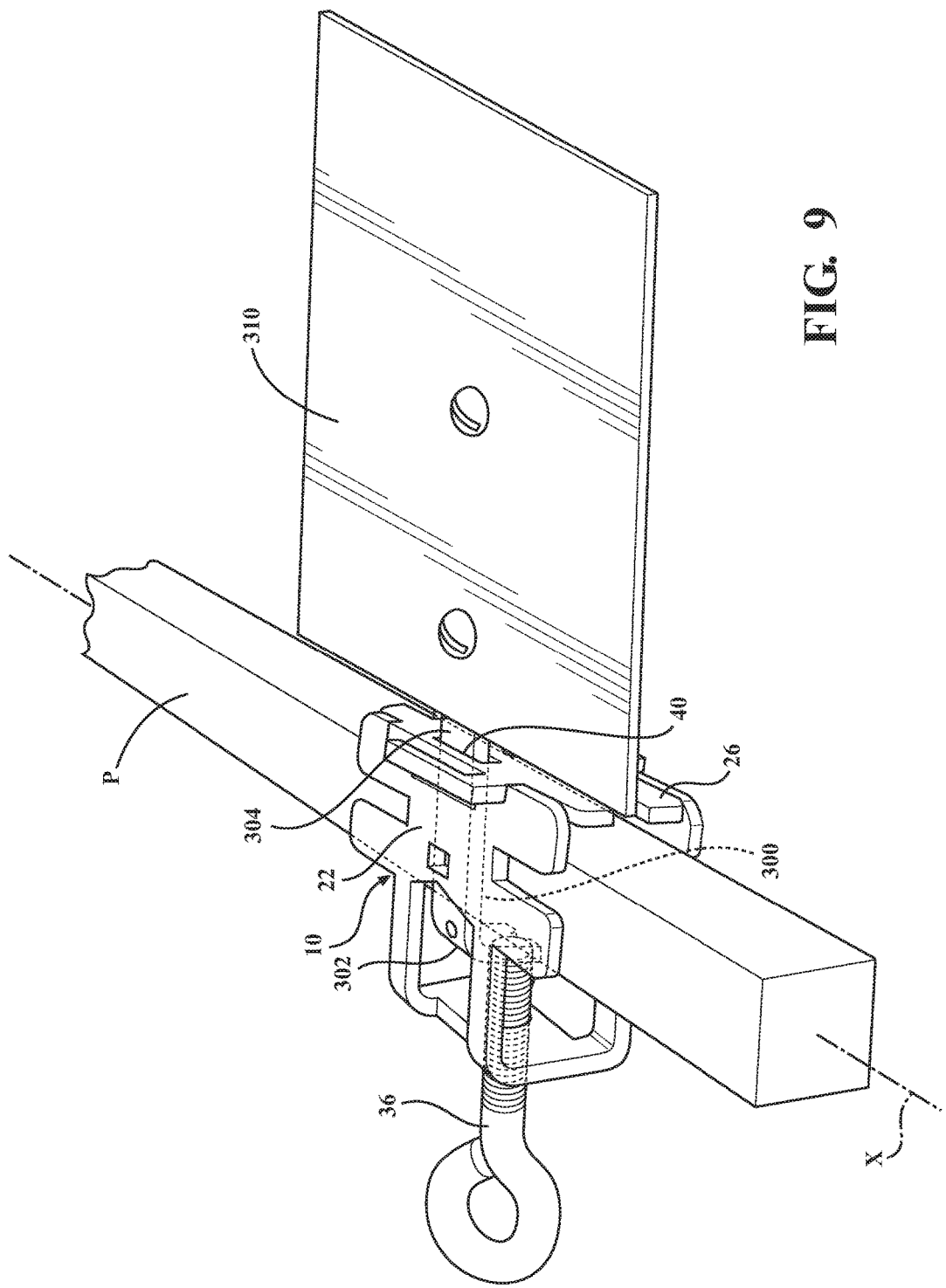
FIG. 9 is a perspective view of the assembled stake, bracket, and extension platform of FIG. 8, but with a horizontal stake orientation through the bracket body.

FIGS. 8 and 9 show a modified structure for mounting a trap-mounting extension to bracket 10 when a stake P is used to support the bracket. An L-shaped or "hooked" stake arm 300 is shown mounting a simple flat platform 310 to bracket 10, although the stake arm 300 could be formed on or attached to the inner end 202 of the flat rotator extension arm 200 shown above in FIGS. 5 through 7 and used to mount the flat extension arm 200 to bracket 10. Stake arm 300 has a downwardly-angled vertical inner end 302 and a horizontal portion 304 connected to platform 310. Vertical inner end 302 is inserted horizontally into the enclosed slot 40 in the front end wall 26 of bracket 10, and then the stake arm 300 is rotated upwardly until the vertical inner end 302 is vertical inside the bracket body 20. While platform 310 and stake arm 300 are shown as two assembled pieces, it will be understood that they could be formed integrally from a single piece of metal or plastic.

Stake arm 300 is configured to engage stake P in one of two ways. First, as shown in FIG. 8, stake P is inserted vertically through the bracket 10, and vertical inner end 302 of the stake arm is inserted far enough into the bracket body interior to abut a front face of stake P, and then locked into position with a fastener F through an aperture 60 in the top wall 22 of the bracket body and through a corresponding aligned aperture 306 in stake arm 300. Once the stake P is clamped against inner end 302 of the stake arm by clamping bolt 36 as described above, the inner end 302 of the stake arm 300 is securely held against the front face of the stake for a strong, reinforced connection, able to support a heavy trap on the outer end of the platform 310 (or any other type of trap-mounting or—supporting extension connected to the bracket 10 by the stake arm 300).

Second, as shown in FIG. 9, stake P is inserted horizontally through the open sides of the bracket 10. However, prior to inserting stake P through the bracket, stake arm 300 is inserted through enclosed slot 40 in the front end wall and inner end 302 positioned at the rear of the interior of the bracket body. This allows stake P to be inserted through the bracket body as shown, with the inner end 302 of the stake arm 300 engaging a rear face of the stake. Clamping bolt 36 is then inserted from the rear of the bracket body as described above, and engages the inner end 302 to clamp the inner end 302 between the clamping bolt and the rear face of the stake P. This provides an extremely strong support for the trap-mounting extension (whether a platform 310 as shown in FIGS. 8 and 9, or for a narrower extension arm such as 200 shown in FIGS. 5-7).

Figure 10:
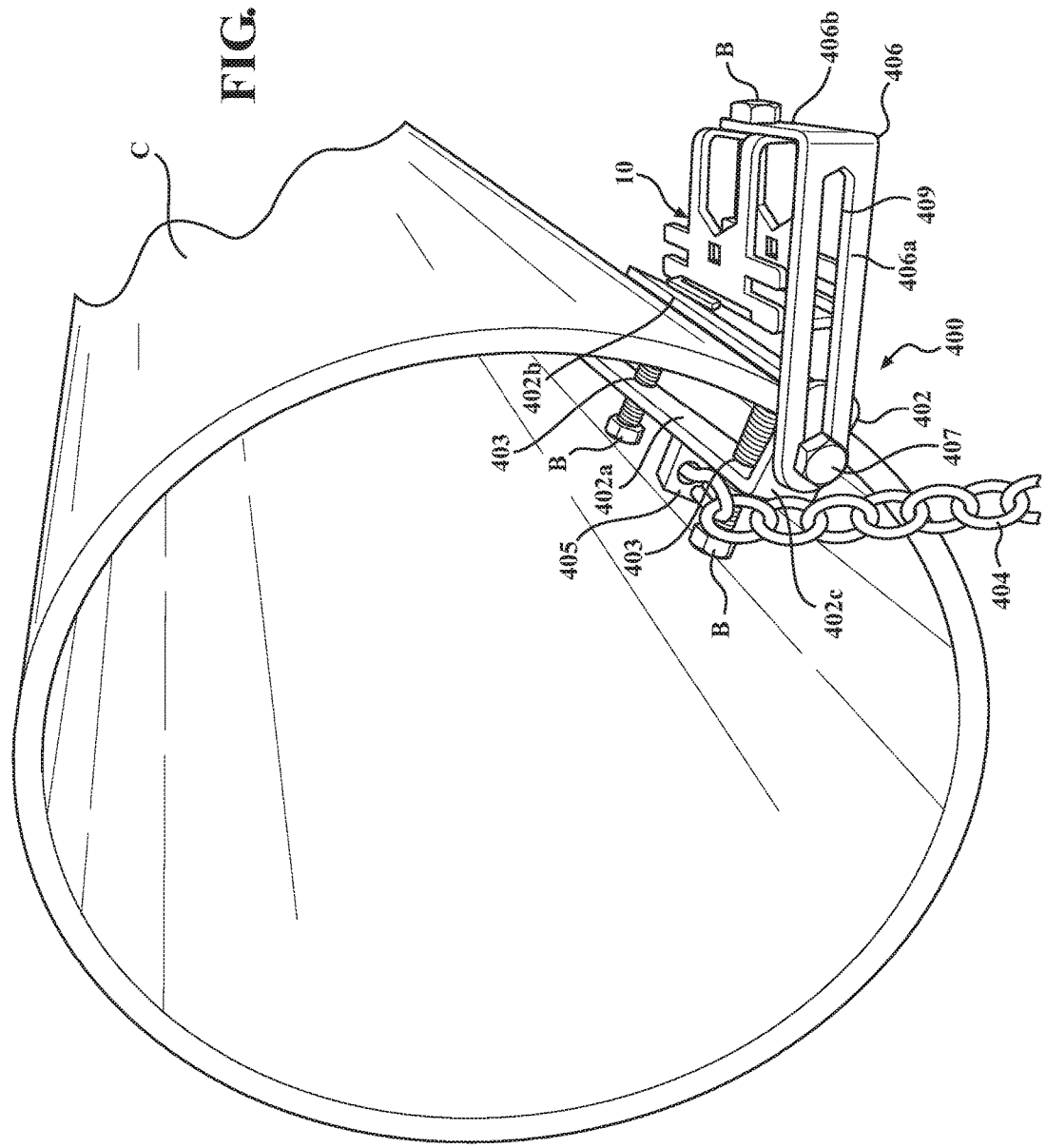
FIG. 10 is a perspective view of an adjustable bracket-mounting clip attached to a culvert pipe, with the bracket supported in a first orientation.
Figure 11:
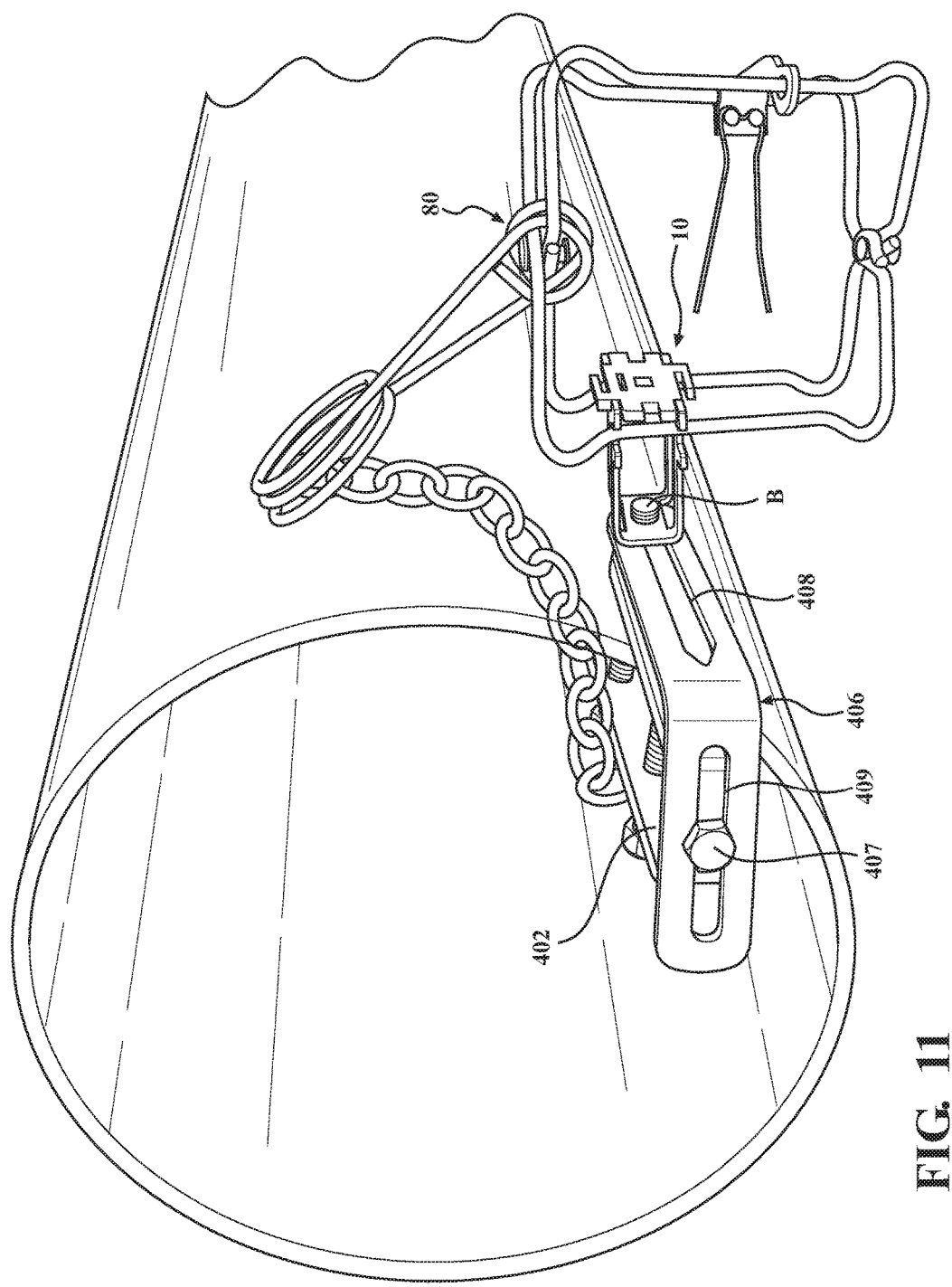
FIG. 11 is similar to FIG. 10, but shows the bracket supported on the clip in a second orientation.

Referring next to FIGS. 10 and 11, an adjustable clip 400 is shown for mounting bracket 10 on the wall of a culvert pipe C adjacent the mouth of the pipe. Clip 400 comprises a generally U-shaped base 402 with inner and outer clamping arms 402a, 402b joined by a short bridge or bight portion 402c. Inner clamping arm includes threaded apertures 403 for bolts B or similar to be threaded through to engage the inner face of the culvert pipe C near the open end of the culvert. A trap securing chain 404 may secured to the inner clamping arm 402a at 405. A generally L-shaped mounting arm 406 is rotationally connected to clamping base 402 at a selectively lockable pivot point 407, for example comprising a bolt threaded through aligned apertures in an inner end of the base portion 406a of the mounting arm 406 and the bight 402c of the clamping base, the bolt connection capable of being frictionally tightened with a nut or similar (not shown) in known manner to lock the mounting arm 406 at a desired rotational angle relative to the clamping base 402 and the culvert pipe C. Base end 406a of the mounting arm 406 includes an elongated slot 409 so that the outer right-angled end 406b of the mounting arm may be moved toward and away from the outer surface of the culvert pipe C when the pivot bolt connection 407 between the clamping base 402 and the mounting arm 406 is loosened. Clip 400 may also be reversed on the culvert pipe wall to mount the bracket and trap adjacent the interior of the culvert pipe wall, as will be understood by those skilled in the art.

As shown in FIG. 10, with the mounting arm 406 adjusted away from the culvert pipe C, bracket 10 may be mounted to the inner face of the outer end 406b of the mounting arm, between the mounting arm and the culvert pipe, for example with a bolt B threaded through the rear clamping opening or some other aperture in the bracket body, and optionally a nut (not visible, connected to the bolt in the interior of the bracket body). As shown in FIG. 11, with mounting arm 406 adjusted toward the culvert pipe C, bracket 10 may be mounted to the outer face of the outer end 406b of the mounting arm 406, with the mounting arm between the bracket and the culvert pipe, again using a bolt B extending through the rear clamping opening or some other aperture on the bracket body, through a slot or aperture 408 in the outer end 406b of the mounting arm, and optionally engaging a nut (not shown) between the outer end 406b and the outer clamping arm 402b of the base, or engaging an aligned aperture (not shown) formed in the outer arm 402b of the clamping base 402.

It will finally be understood that the disclosed embodiments represent presently preferred examples of how to make and use the invention, but are intended to enable rather than limit the invention. Variations and modifications of the illustrated examples in the foregoing written specification and drawings may be possible without departing from the scope of the invention. It should further be understood that to the extent the term "invention" is used in the written specification, it is not to be construed as a limiting term as to number of claimed or disclosed inventions or discoveries or the scope of any such invention or discovery, but as a term which has long been used to describe new and useful improvements in science and the useful arts. The scope of the invention supported by the above disclosure should accordingly be construed within the scope of what it teaches and suggests to those skilled in the art, and within the scope of any claims that the above disclosure supports in this application or in any other application claiming priority to this application.

The invention claimed is:

1. A trap-holding bracket for holding leg-hold and body-gripping type traps on an elevated support, the trap-holding bracket comprising:
    a generally box-shaped bracket body comprising a top wall, a bottom wall, a front end wall, and a rear end wall defining a hollow interior;
    vertical stake support apertures formed in vertical alignment through the top and bottom walls, the vertical stake support apertures configured to allow a stake to be inserted vertically through the hollow interior of the bracket body;
    a horizontal opening in the rear end wall of the bracket body configured to allow a stake-engaging member to be inserted horizontally through the rear end wall to lock the bracket in place on the stake;
    horizontal tab arms extending horizontally from sides of the top and bottom walls to define sets of vertically-spaced and vertically-aligned horizontal jaw slots outwardly of the hollow body on each side of the hollow body, the horizontal tab arms configured to receive and hold inner wire ends of a body-holding trap in their inwardly-pressed set position; and,
    a first generally L-shaped vertical tab arm extending vertically above or below the front end wall and defining an open-ended lateral slot configured to receive an outer base end of a leghold trap with a lateral sliding motion.

2. The trap-holding bracket of claim 1, wherein the bracket includes a second generally L-shaped vertical tab arm extending vertically below or above the front end wall opposite the first generally L-shaped vertical tab arm and defining an open-ended lateral slot configured to receive an outer base end of a leghold trap with a lateral sliding motion.

3. The trap-holding bracket of claim 1, wherein the bracket includes an enclosed horizontal slot in the front end wall, and further comprising a removable trap-holding extension with an inner end configured to be inserted in the enclosed horizontal slot and an outer end configured to support a leghold trap at a location spaced outwardly from the bracket.

4. The trap-holding bracket of claim 3, wherein the trap-holding extension comprises a flat multi-angled arm with the outer end having a longitudinal axis offset laterally from a longitudinal axis of the inner end and configured to support a leghold trap in a direction aligned with or parallel to the longitudinal bottom brace.

5. The trap-holding bracket of claim 3, wherein the trap-holding extension comprises a generally L-shaped stake hook arm comprising a vertical inner end configured to be inserted horizontally through the enclosed slot in the front end wall of the bracket body into the hollow interior and then rotated to a vertical position and positioned against a front or rear face of a stake inserted through the hollow interior of the bracket body, and further comprising a horizontal extension arm extending outwardly from the vertical inner end and configured to be inserted through the enclosed slot in the front end wall when the vertical inner end is located in the hollow interior of the bracket body and rotated to a vertical position, and further wherein an outer end of the horizontal extension arm comprises a trap supporting portion spaced from the vertical inner end.

6. The trap-holding bracket of claim 5, wherein the outer end of the horizontal extension arm of the trap-holding extension comprises a horizontal platform wider than the horizontal extension arm.

7. In combination with the trap-holding bracket of claim 1, an adjustable clip configured to mount the bracket on the wall of a culvert pipe in different orientations, the adjustable clip comprising a generally U-shaped clamping base with inner and outer clamping arms joined in spaced parallel fashion by a bight portion, the inner clamping arm including a threaded aperture for a threaded fastener to be threaded through the inner clamping arm to engage an inner face of a culvert pipe near an open end thereof; and, a generally L-shaped mounting arm comprising a base portion connected to the bight portion of the clamping base and an outer right-angled end spaced from and generally parallel to the outer clamping arm, the base portion of the mounting arm rotationally connected to the clamping base at a selectively lockable pivot point, the selectively lockable pivot point capable of being tightened to lock the mounting arm at a desired rotational angle relative to the clamping base and a culvert pipe, and further wherein the base portion includes an elongated slot engaging the selectively lockable pivot point so that the outer right-angled end of the mounting arm may be moved toward and away from the outer clamping arm and an outer surface of a culvert pipe when the selectively lockable pivot point between the clamping base and the base portion of the mounting arm is loosened.

8. The trap-holding bracket of claim 1, wherein the hollow bracket body has substantially open sides communicating with the hollow interior of the bracket body to define a horizontal passage through the hollow interior of the bracket body of greater size than a vertical passage through the hollow interior of the bracket body defined by the vertical stake support apertures in the top and bottom walls.

9. In combination with the trap-holding bracket of claim 1, a leghold trap with a dog end, and further wherein the outer base end of the leghold trap received in the open-ended lateral slot is the dog end.

10. The trap-holding bracket of claim 1, wherein the first generally L-shaped vertical tab arm extends from the front end wall in a vertical plane generally coplanar with the front end wall.

11. The trap-holding bracket of claim 2, wherein the first and second generally L-shaped vertical tab arms extend respectively from opposite upper and lower edges of the front end wall in a vertical plane generally coplanar with the front end wall.

12. The trap-holding bracket of claim 2, wherein the open-ended lateral slots defined by the first and second generally L-shaped vertical tab arms open in opposite lateral directions.

\* \* \* \* \*